(No Model.) 2 Sheets—Sheet 1.

W. H. HAMPSON.
COUPLING.

No. 508,705. Patented Nov. 14, 1893.

WITNESSES.
Charles L. Ellis
Harold S. Bangs

INVENTOR
William H. Hampson
BY
E. Frank Woodbury
ATTORNEY (No Model.) 2 Sheets—Sheet 2.

W. H. HAMPSON.
COUPLING.

No. 508,705. Patented Nov. 14, 1893.

WITNESSES.
Charles L. Ellis.
Harold S. Bangs.

INVENTOR.
William H. Hampson,
BY
E. Frank Woodbury,
ATTORNEY.

UNITED STATES PATENT OFFICE.

WILLIAM H. HAMPSON, OF CAMBRIDGE, MASSACHUSETTS.

COUPLING.

SPECIFICATION forming part of Letters Patent No. 508,705, dated November 14, 1893.

Application filed August 7, 1893. Serial No. 482,588. (No model.)

*To all whom it may concern:*

Be it known that I, WILLIAM H. HAMPSON, a citizen of the United States, residing at Cambridge, in the county of Middlesex and State of Massachusetts, have invented a new and useful Coupling, of which the following is a specification.

My invention relates to couplings designed for use upon railroad cars and they are especially adapted for use upon locomotives for the coupling of steam heating pipes.

The object of my invention is to make a coupling that will be efficient and durable, and that may be readily kept tight with a minimum amount of care.

The application of my invention to a locomotive or car permits the non-use of the common brake or steam heating hose. Nevertheless, the coupling may be used in connection with the hose, especially as applied to cars, this form of connection being desirable as the cars are frequently uncoupled, and as the tender of a locomotive is seldom uncoupled, it will not be necessary to use my coupling with hose connections when applied to a locomotive.

The rubber hose now used in making connections between a locomotive and its tender or between cars, if it is used as a brake hose, is soon cut or dissolved and its efficiency destroyed by the oil from the air pump, and if it is used as a steam heating hose, it is rapidly made non-flexible by the hardening action of the steam. These defects are obviated by my coupling when used without hose connections.

The construction of the coupling is such that, especially when applied with steam heating hose connections, the free irregular movements of the coupling are not practically affected by the rigidity of the hose.

Figure 1:
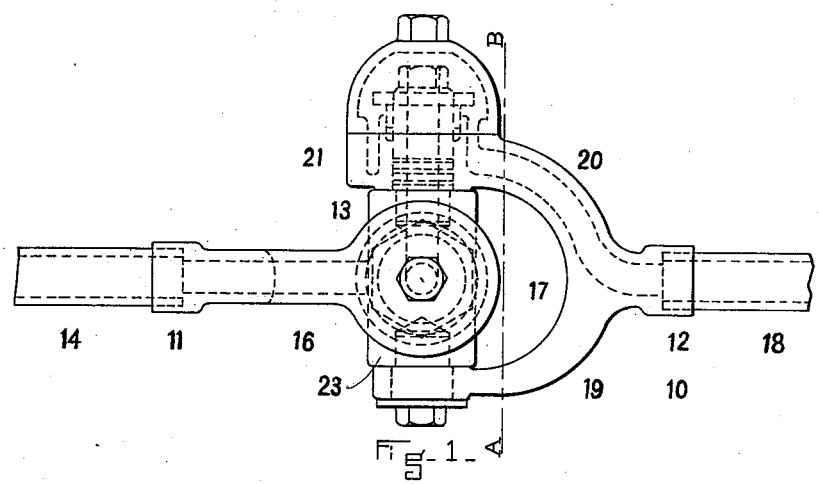
Figure 2:
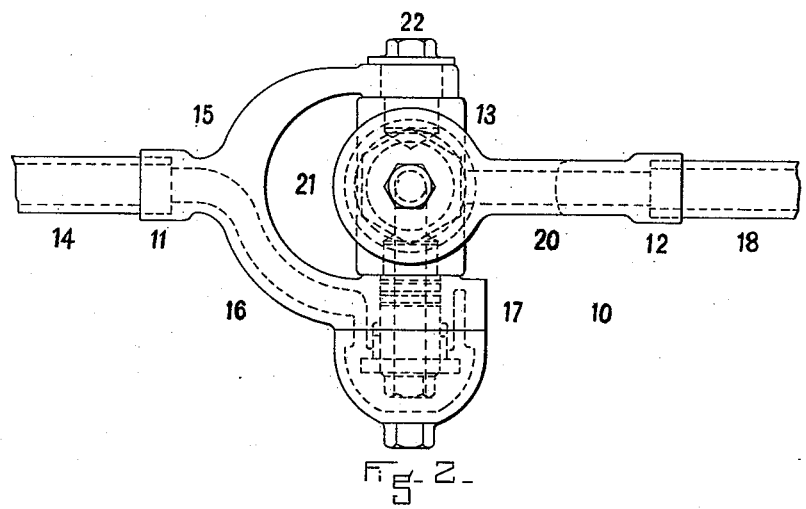
Figure 3:
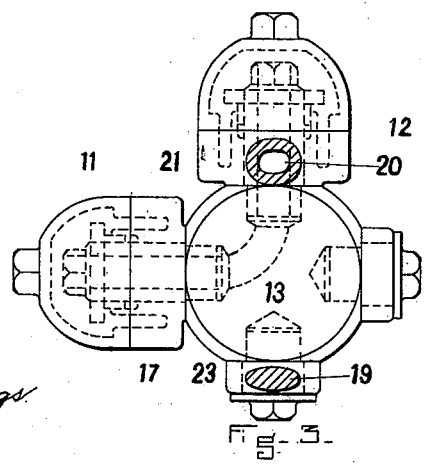
Figure 4:
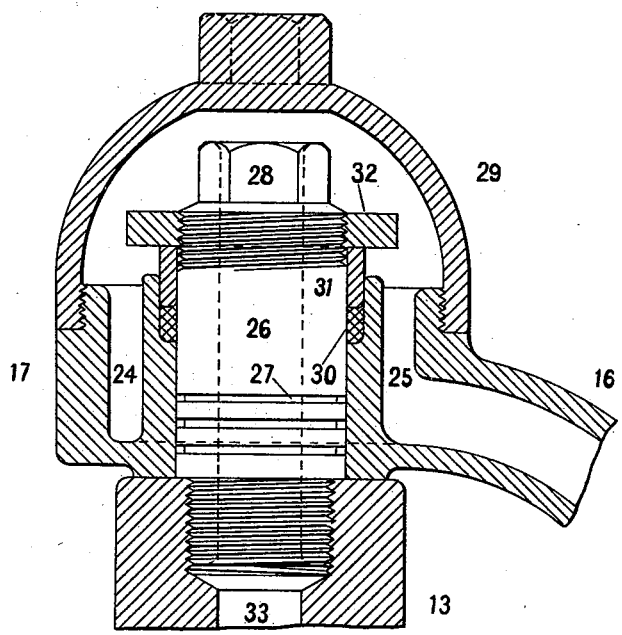
Figure 5:
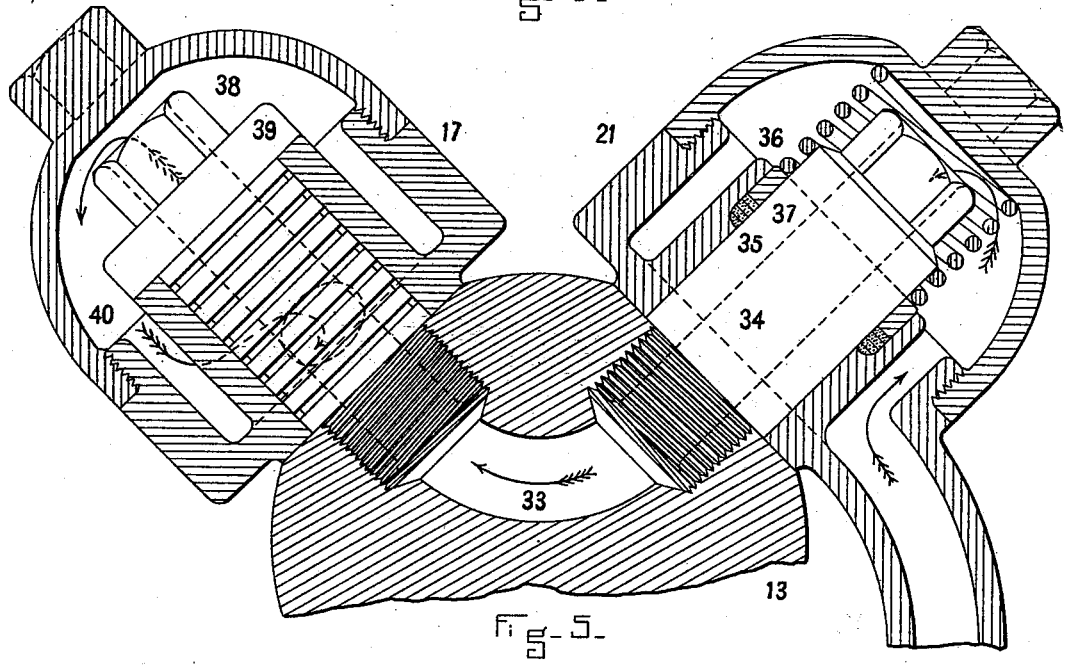

Figure 1 represents my coupling in side elevation. Fig. 2 is a plan of Fig. 1, and Fig. 3 is a sectional view of Fig. 1 on line A B. Fig. 4 represents upon an enlarged scale in central section one of the yoke ends and a portion of the central cross, the hollow gudgeon or spindle being shown in elevation. The construction of this gudgeon or spindle is the same as shown in Figs. 1, 2, and 3 and it is made for steam heating use. Fig. 5 represents upon an enlarged scale in sectional view, two of the yoke ends and a portion of the central cross, the hollow spindles being represented in elevation, the path of the travel of the steam or air from one yoke end to the other being represented by arrows.

The coupling 10 is of a class known as Hooke's universal joint, and it is composed of the two yokes 11 and 12, the central cross 13, and the gudgeons represented. The yoke 11, is provided with the connecting hose or pipe 14 and the two yoke arms 15 and 16, the arm 15 being solid, and the arm 16 being hollow to permit the passage of the steam or air from the connecting pipe through the hollow arm into the yoke end 17 provided with the hollow gudgeon. In the same manner the yoke 12 is provided with the connecting pipe 18 and the two yoke arms 19 and 20, the arm 19 being solid, and the arm 20 being hollow to permit the passage of the steam or air from the connecting pipe through the hollow arm into the yoke end 21 provided with the hollow gudgeon. The solid yoke arm 15 is provided with the usual solid gudgeon 22, and in the same manner, the solid yoke arm 19 is provided with the usual gudgeon 23. These solid gudgeons are fastened to the central cross and they are designed to operate in the usual manner.

The yoke ends 17 and 21, as represented by Figs. 1—2 and 3, being alike, a description of the yoke end 17 only will be given, as illustrated upon an enlarged scale, by Fig. 4. The yoke end 17 is provided with the following: an annular port 24 which connects with the port 25 of the hollow yoke arm 16; hollow gudgeon 26 having the water or oil packing grooves 27 and the upper threaded end 28, and the cap 29. The hollow gudgeon 26 which is securely fastened to the central cross 13, is provided with the packing 30, packing ring 31, and gland or packing nut 32, by means of which, the packing may be compressed or made up by screwing down the gland. It will be observed, that when it is desired to renew the packing, by unscrewing the steam tight cap and then screwing out the hollow gudgeon, the packing ring and gland and probably the packing will come out with the gudgeon, thereby facilitating the renewal of the packing. The central cross 13 being provided with the port 33, it is obvious that there will always be an open or continuous port or passage way from port 33 of the central cross, through the hollow gudgeon into the annular port 24, and then into and through the port 25 of the hollow yoke arm.

In Fig. 5 the entire central cross port 33 is shown. The yoke ends 17 and 21 are each shown in section and they are substantially the same as represented by Fig. 4 except in particulars relative to the packing of the hollow gudgeons.

The packing shown by Fig. 4 and described is especially adapted for use in connection with steam heating, no springs being used, and the packing represented in Fig. 5 as applied to the hollow gudgeon 34 of the yoke end 21 is designed for air brake use and the leather packing 35 is compressed or made up by the spiral spring 36 between which and the packing is placed the loose packing ring or follower 37.

The packing shown in Fig. 5 as applied to the hollow gudgeon 38 consists of the collar 39 which is formed on the gudgeon and which is made tight by the differential area pressures within the yoke end which tends to keep the flange or collar 39 in contact under pressure with the end of the circular bearing 40 of the yoke end.

The three hollow gudgeons 26, 34, and 38, are of the same length and are screwed into the central cross in the same manner, as shown by Figs. 4 and 5.

The path of the travel of the steam or air through the coupling, when placed between a locomotive and its tender or between cars is illustrated by means of arrows in Fig. 5. The steam or air from one connecting pipe, entering the yoke end 21 passes through the hollow gudgeon 34, central cross port 33, hollow gudgeon 38, into the other yoke end 17 and from thence into the other connecting pipe through the hollow arm, or vice versa.

The free or unobstructed passage of the steam or air through the coupling will at all times be the same regardless of the angularity of the connecting pipes, and my coupling acts at all times as a universal joint and at the same time the packing is of the simplest form and the repacking can be accomplished very easily, and the coupling is at all times efficient and it is strong and durable.

What I claim as new, and desire to secure by Letters Patent, is—

1. In a universal joint coupling, the combination of the yokes each yoke having a hollow arm and a ported yoke end, with the central cross provided with the two packed hollow gudgeons which are fastened to the central cross, each gudgeon being inclosed or covered by the cap on the yoke end, substantially as and for the purposes set forth.

2. A universal joint coupling, the yokes of which are each provided with a hollow arm and a ported yoke end having a tight cap, in combination with the central cross which is provided with a central cross port and the hollow gudgeons fastened to the cross, substantially as described.

3. In a universal joint coupling the central cross provided with hollow gudgeons which are securely fastened to the cross, in combination with the yokes having hollow arms and ported and capped yoke ends said yokes being adapted to turn upon said packed gudgeons, substantially in the manner and for the purposes set forth.

4. In a universal joint coupling, so constructed as to allow flexure in any direction, the central cross provided with the hollow gudgeons which are securely fastened to the cross, in combination with the yokes having the hollow arms and the ported and capped yoke ends, said yokes being adapted to turn upon said packed gudgeons, substantially as and for the purposes set forth.

In testimony whereof I have signed my name to this specification in the presence of two subscribing witnesses.

WILLIAM H. HAMPSON.

Witnesses:
E. FRANK WOODBURY,
GEORGE L. DOLBEARE.